US005743374A

United States Patent [19]
Monsees

[11] Patent Number: 5,743,374
[45] Date of Patent: Apr. 28, 1998

[54] STACK TURNER AND REPLENISHER AND METHOD

[76] Inventor: Claude E. Monsees, 80 Carowood Dr., Charlotte, N.C. 28226

[21] Appl. No.: 519,242

[22] Filed: Aug. 25, 1995

[51] Int. Cl.⁶ ............................................ B65G 47/24
[52] U.S. Cl. ................... 198/403; 198/409; 198/468.6; 414/771; 414/773; 414/349; 414/350; 414/352; 414/782; 414/758
[58] Field of Search ......................... 198/403, 409, 198/468.6; 414/349, 350, 352, 758, 771, 773, 782, 783, 788

[56] References Cited

U.S. PATENT DOCUMENTS

| | | | |
|---|---|---|---|
| 2,520,252 | 8/1950 | Mutchler | 414/771 |
| 2,832,478 | 4/1958 | Malewicz | 414/773 |
| 3,072,266 | 1/1963 | Holcroft | 414/773 |
| 3,314,554 | 4/1967 | Cuniberti | 198/403 |
| 3,643,939 | 2/1972 | Nussbaum et al. | 471/62 |
| 3,738,519 | 6/1973 | Edwards | 414/771 |
| 3,895,722 | 7/1975 | Pluntz | 198/403 |
| 3,908,836 | 9/1975 | Ikeda | 214/8.5 |
| 4,444,537 | 4/1984 | Werner | 414/107 |
| 4,854,815 | 8/1989 | Augst | 414/788 |
| 5,238,239 | 8/1993 | Lachapelle | 271/275 |
| 5,288,200 | 2/1994 | Burgers et al. | 414/782 |

Primary Examiner—William E. Terrell
Assistant Examiner—Khoi H. Tran
Attorney, Agent, or Firm—Hardaway Law Firm P.A.

[57] ABSTRACT

A stack turner and replenisher 10 is provided for keeping a hopper of a carton prefeeder P filled with carton blanks, traditionally a job that requires a human worker and causes carpal tunnel syndrome due to the inverting motion required. Stack turner 10 allows for the movement of a stack of blanks in a lateral direction as well as in an inverted u-shaped path. Clamp 53, with adjustable upper and lower plates 54,55, is used to pick up a stack of blanks from a source of such blanks. Clamp 53 then moves upwardly, laterally, and downwardly along groove 52, while an upper portion 50 of stack turner 10 simultaneously moves laterally toward prefeeder P. Clamp 53 then deposits the blanks in the hopper of prefeeder P. Finally, stack turner 10 retraces its path in order to pick up another stack of blanks and repeat the procedure, thus ensuring that the hopper of prefeeder P is always filled with carton blanks. Stack turner 10 also squares the stack of blanks both vertically and horizontally.

20 Claims, 5 Drawing Sheets

STACK TURNER AND REPLENISHER AND METHOD

BACKGROUND OF THE INVENTION

In the art of box making, very high machine speeds cause supplies, i.e., carton blanks, to be processed fairly quickly. An example of a machine that feeds such supplies to a folder/gluer is U.S. Pat. No. 5,238,239, to LaChapelle and assigned to Roberts Systems, Inc. Machines such as these are known as prefeeders because they prepare carton blanks for folding and gluing by separating individual blanks from a stack of blanks.

Traditionally, the carton blanks fed by prefeeders are manufactured at an earlier time and accumulated in upright stacks on an outfeed conveyor. A human worker picks up these individual stacks one-at-a-time, inverts them, and places them in the hopper or magazine of the prefeeder. The inversion step places great stress on the machine operator's wrists and is the source of repetitive motion or carpal tunnel syndrome.

With the trend towards automation and the desire to decrease the incidence of carpal tunnel syndrome, there is much room for improvement within the art.

OBJECTS OF THE INVENTION

It is an object of the invention to provide a stack turner and replenisher for keeping a hopper of a carton prefeeder filled with carton blanks.

It is a further object of the invention to provide a stack turner and replenisher that allows for the movement of stacks both in a lateral direction as well as along an inverted u-shaped path.

It is yet a further object of the invention to provide a stack turner and replenisher that eliminates repetitive motion or carpal tunnel syndrome in the operator thereof.

It is still yet a further object of the invention to provide a stack turner and replenisher that is of simple construction and is capable of being moved from one position to another.

These and other objects of the invention are achieved by a stack turner and replenisher comprising: a clamp for receiving a stack of articles; at least one power source for moving the clamp in a lateral direction and along an inverted u-shaped path; whereby operating the at least one power source inverts and moves the stack of articles received in the clamp from a first lateral position to a second lateral position.

DETAILED DESCRIPTION OF THE DRAWINGS

With reference to the figures, a stack turner and replenisher and method that meets and achieves the various objects of the invention referred to above will be described in greater detail.

Figure 1:
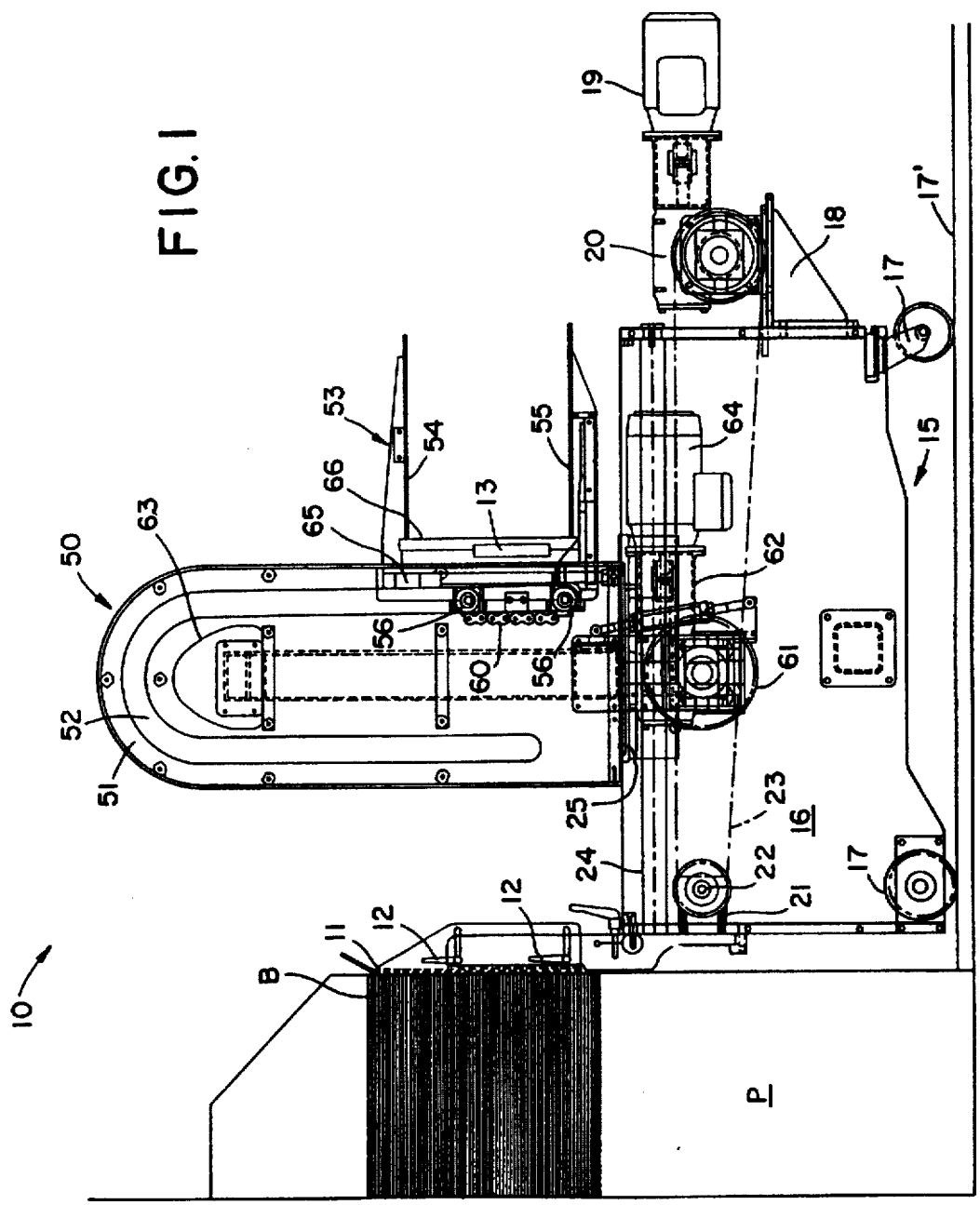
FIG. 1 is an elevational view of a stack turner and replenisher according to the invention.
Figure 2:
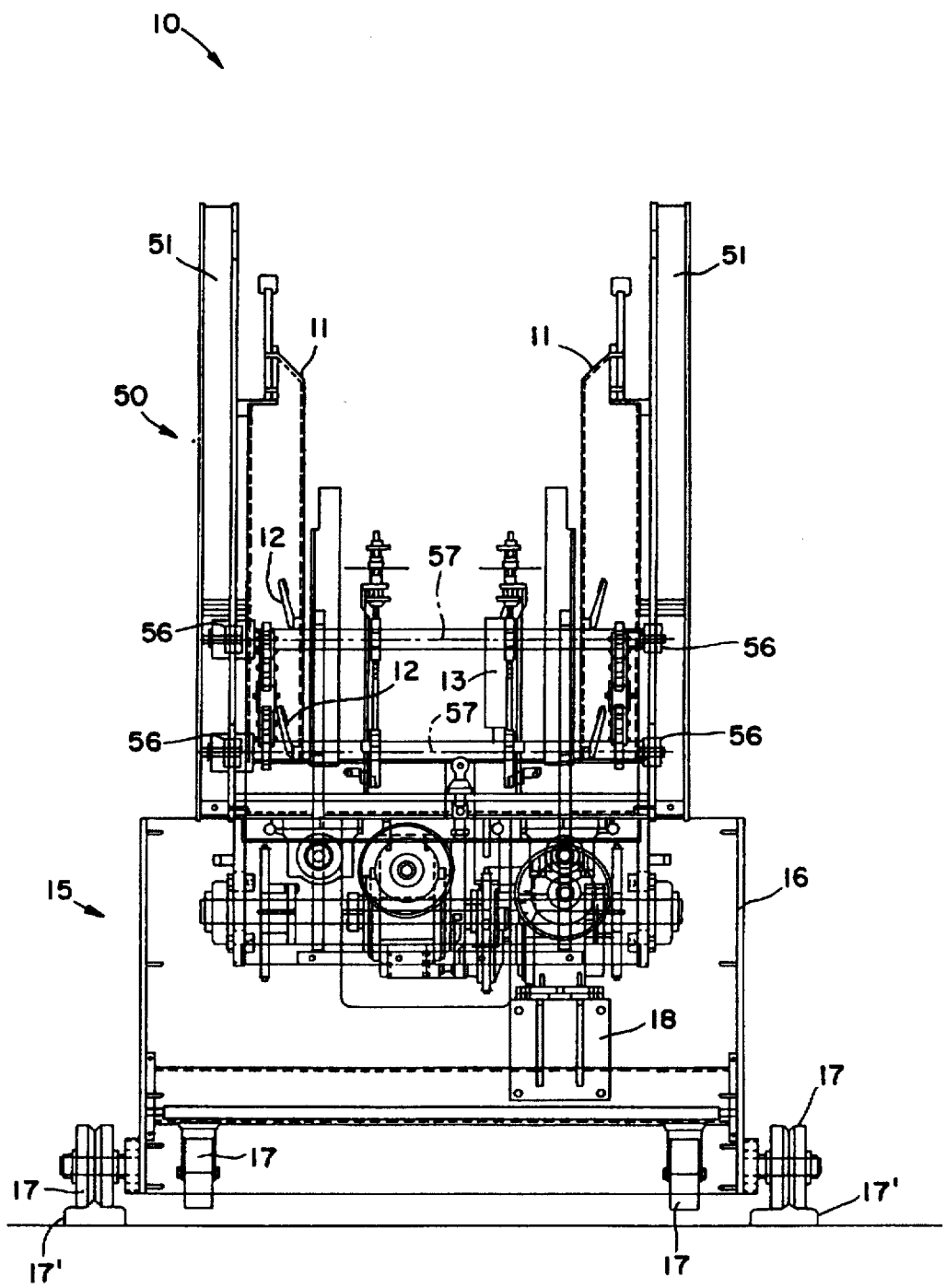
FIG. 2 is an end view of a stack turner and replenisher according to the invention.

Stack turner and replenisher 10, as shown in FIG. 1, will be referred to herein as stack turner 10. By use of grooved casters 17, stack turner 10 can be wheeled around for placement between a carton prefeeder P, such as shown in U.S. Pat. No. 5,238,239 to LaChapelle, and a source of stacks of carton blanks, e.g., an outfeed conveyor from a carton blank forming device. This placement is required because stack turner 10 is meant to keep the hopper of prefeeder P filled with carton blanks B from a source of stacks of carton blanks. Typically, there will be an angle iron 17' on the plant floor for receiving the grooves of casters 17 and aligning prefeeder P, stack turner 10, and any conveyors upstream of stack turner 10. Spaced apart extractor plates 11 hold the blanks in place in the prefeeder P as clamp 53 is removed, as will be described later. Extractor plates 11 are spaced apart a distance great enough that clamp 53 can pass between them but small enough to prevent blanks from being pulled out of the prefeeder P. Releasable locks 12 allow the position of extractor plates 11 to be varied depending upon the size of the articles being fed.

Stack turner 10 generally comprises two parts: namely, lower portion 15 and upper portion 50. Upper portion 50 has clamp 53, formed by upper plate 54, lower plate 55, and rear registration wall 66, for picking up, holding, clamping, and squaring stacks of articles. Fluidic cylinder 13 allows the distance between upper plate 55 and lower plate 54 to be varied so stack turner 10 can handle stacks of different heights, increasing the flexibility and usability of stack turner 10. The distance between upper plate 55 and lower plate 54 also needs to be adjusted to allow for the loading and unloading of the stack therebetween as will be described. Any mechanism can be used to adjust the distance between upper and lower plates 55, 54 including a rack and stop mechanism. Furthermore, cylinder 13 may be an air or hydraulic cylinder. Clamp 53 will usually be narrower than the blanks that it will invert and move.

Lower portion 15 comprises a cabinet structure 16 that contains and supports the various moving mechanisms required to move clamp 53 from a first position, where it can pick up a stack of articles, to a second position, where it can drop off the stack of articles in the hopper of prefeeder P. Lower portion 15 is stationary once it is wheeled into position using casters 17. For lateral movement of upper portion 50 and clamp 53, a first power source is used. This power source comprises a first motor 19, which is typically a DC motor that provides for soft stops and starts. Motor 19 is mounted to the outside of cabinet structure 16 by angle-bracket support 18. The output shaft of motor 19 has sprocket 20 thereon. Mounted to the inside of cabinet 16 by use of support 21 is idler sprocket 22. Chain 23 spans sprockets 20, 22. Belts and pulleys may be used instead of chains and sprockets. At least one, but preferably two, rods 24 also span the length of cabinet 16. Riding along rods 24 are upper portion support bearings 25. Bearings 25 are preferably ball bearings that have cylindrical bores through which rods 24 pass. The ends of chain 23 are connected to opposite sides of support bearings 25. Thus, as motor 19 is operated, support bearings 25 move laterally along rods 24 in a direction, i.e., left or right, dependent upon the direction of rotation for the shaft of motor 19.

Upper portion 50 is the movable portion of stack turner 10, once it has been wheeled into position using casters 17. Upper portion 50 generally comprises two side plates 51 mounted on support bearings 25. Thus, as support bearings 25 move as described above, so do side plates 51. Motor 19 and sprocket 22, both also described above, are mounted to cabinet 16 on opposite sides of side plates 51. Each side plate or guide 51 has an inverted u-shaped groove or slot 52 therein. Within grooves or slots 52 are a plurality of rolling members, such as rollers 56, mounted to both sides of carriage 65. Also mounted to carriage 65 are upper and lowers plates 54, 55 of clamp 53 and cylinder mechanism 13. A second power source is used for moving clamp 53 along the path defined by inverted u-shaped slot 52. This second power source comprises a second motor 64, which will also preferably be a DC motor that provides for soft starts and stops. First motor 19 and second motor 64 are independently controlled by a controller (not shown). Second motor 64 has transmission 62 and sprocket 61 attached to its output shaft. Parabolic slide 63 is mounted adjacent the top of one of side plates 51. Roller chain 60 spans sprocket 61 and slide 63 and has carriage 65 mounted to its ends. Alternately, belts and pulleys may be used instead of a roller chain and sprocket. As motor 64 is operated, carriage 65 and clamp 53 move along the inverted u-shaped path in a direction dependent upon the direction of rotation of the shaft of motor 64.

While stack turner 10 has been described as having two separate power sources, it is conceivable that by using clutches and other mechanical means, stack turner 10 can be operated by a single power source. Furthermore, although they are not shown, stack turner 10 will be surrounded by appropriate safety guards, shields and the like.

The structure of stack turner 10 having been described, its method of operation will now be discussed with reference to FIGS. 3A–3G.

Figure 3A:
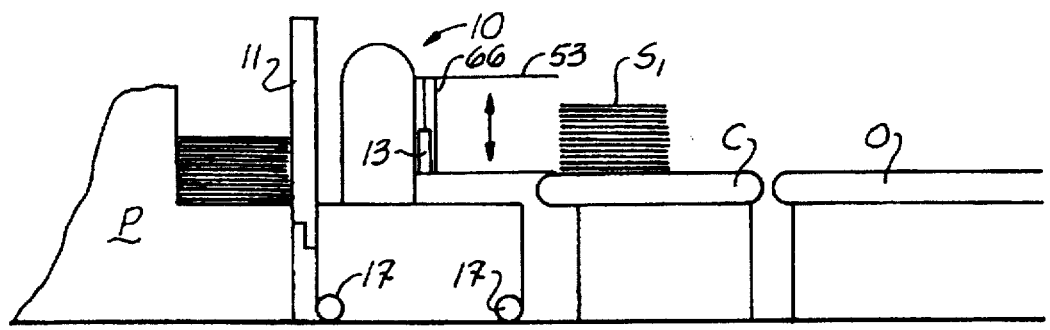
FIGS. 3A-3G are simplified elevational views demonstrating the operation of a stack turner and replenisher according to the invention.

In FIG. 3A, stack turner 10 is wheeled, via casters 17, into position between article prefeeder P and conveyor C adjacent output conveyor O of a device for forming stacks of carton blanks $S_1$. Conveyor C has the requisite configuration such that lower plate 55 of clamp 53 can pass thereunder and thus pass under stack $S_1$. This is usually achieved by providing conveyor C with a series of spaced apart parallel belts. However, it is possible that output conveyor O can also be so configured, eliminating the need for conveyor C. Alternatively, in place of conveyor C, there may simply be already packaged or supplied stacks of articles sitting on a support that allows lower plate 55 of clamp 53 to pass thereunder as described above. Regardless of their source, according to the prior art, human workers had to manually remove the stacks of articles from their source, invert them, and place them in the hopper of the article prefeeder. According to the invention, this human worker is either no longer necessary or at least no longer subject to repetitive motion or carpal tunnel syndrome caused by the inversion step.

Figure 3B:
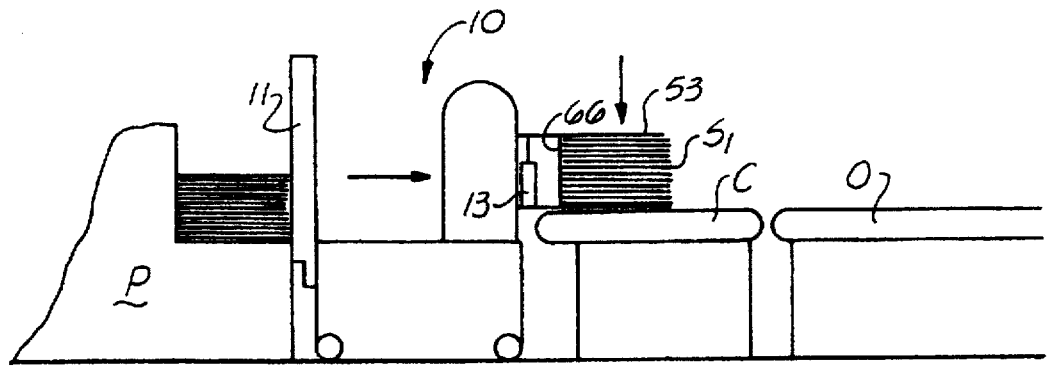

In FIG. 3A, cylinder 13 opens clamp 53 to the maximum width by separating upper plate 54 and lower plate 55 by their maximum amount. Upon receipt of a signal, motor 19 is rotated in a first direction, moving upper portion 50 and clamp 53 to the right, towards stack of articles $S_1$ to be moved (FIG. 3B). The signal can be created in a variety of ways, for example, by a sensor in the prefeeder hopper signalling that the hopper will soon need replenishment or by a timer counting off enough time during which the hopper would become partially emptied. Clamp 53 movement continues in the stated manner while lower plate 55 of clamp 53 moves under stack $S_1$ and until stack $S_1$ substantially abuts rear registration wall 66, allowing clamp 53 to scoop up stack of articles $S_1$ to be moved. Cylinder 13 than contracts, closing the distance between upper and lower plates 54, 55, and therefore, clamping the stack of articles $S_1$ between upper and lower plates 54, 55.

Figure 3C:
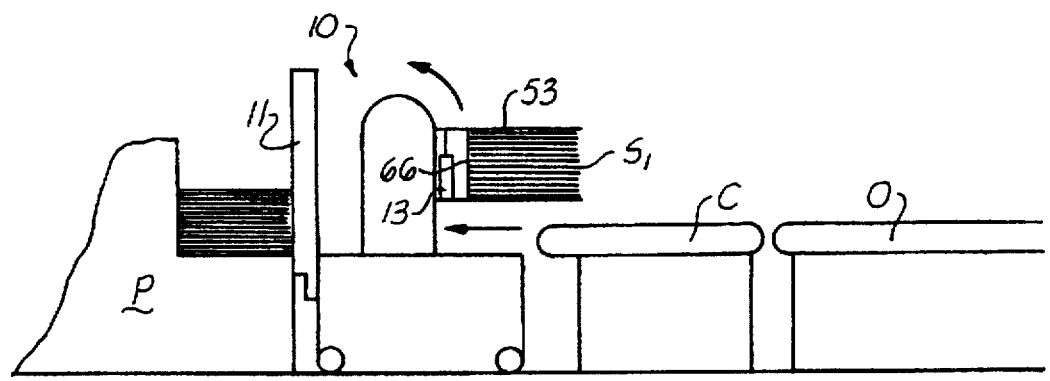
Figure 3D:
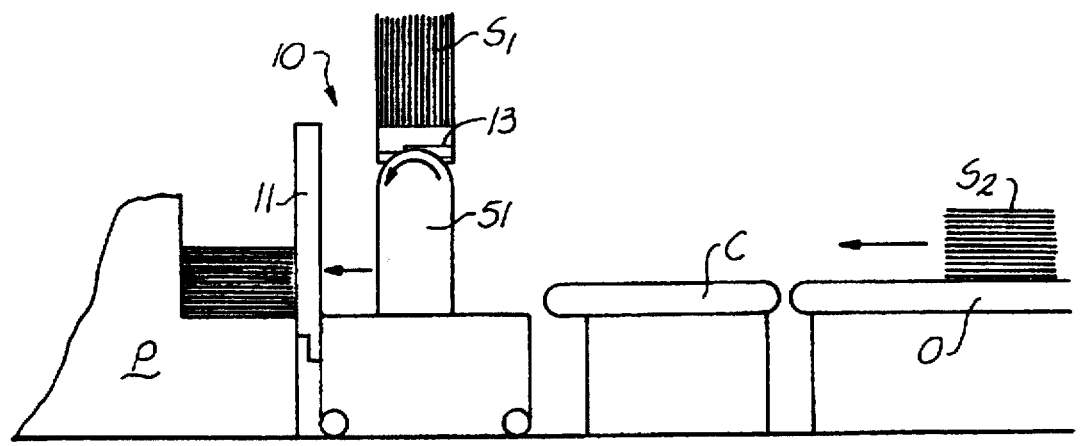

In FIG. 3C, the direction of rotation of motor 19 is reversed. Thus, upper portion 50 and clamp 53 move away from the source of the stack of articles, e.g., conveyor C, and towards the left, where the prefeeder hopper is located. Simultaneously, motor 64 is rotated in a first direction. This causes clamp 53 to move upwardly along slot or groove 52 until it reaches the top of side plate 51 (FIG. 3D). There clamp 53 travels around chain slide 63, inverting stack $S_1$ while it is within clamp 53. At the uppermost point along the inverted u-shaped path, cylinder 13 slightly releases its grip on stack $S_1$. This allows for stack $S_1$ to fall downwardly within clamp 53 until it completely rests against rear registration wall 66, squaring stack $S_1$ against the rear registration wall 66 of clamp 53. This is called vertical squaring. Furthermore, because at this point all the articles of stack $S_1$ will be on edge, it is much easier to align the articles in the stack in a lateral direction by tamping on the sides of stack $S_1$ either by an operator's hand or some mechanical means such as air jets or tamping fingers (not shown). This is called lateral squaring. In some instances, stack $S_1$ will be held at this uppermost position until prefeeder P signals to stack turner 10 that it is in need of replenishment. At that point, the process continues.

Figure 3E:
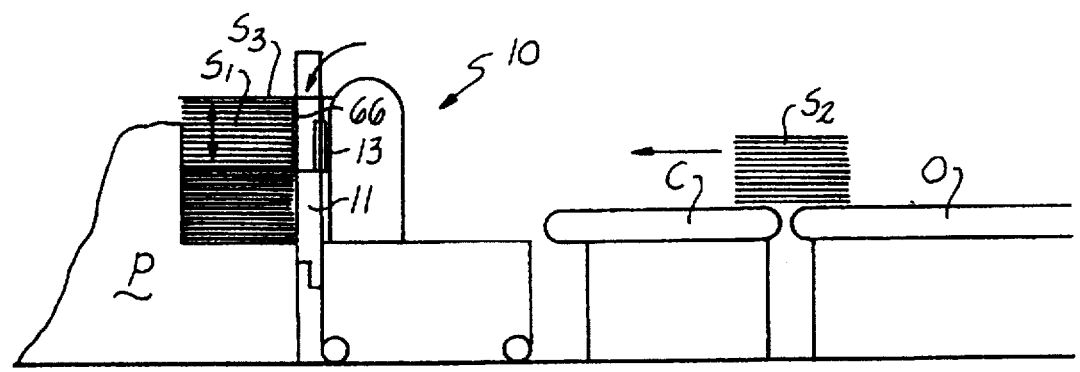

In FIG. 3E, carriage 65 and rollers 56 are lowered down the other leg of groove or slot 52. This continues until clamp 53 passes between spaced apart extractor plates 11 and rests upon the stack of articles already within the hopper of prefeeder P, wherein motors 19, 64 stop. The position of registration wall 66 is such that stack $S_1$ protrudes out enough so that even though stack $S_1$ is wider than the distance between extractor plates 11, stack $S_1$ can be placed on the side of extractor plates 11 adjacent the prefeeder hopper. FIG. 3H shows a plan view of this configuration. At this point cylinder 13 will again open clamp 53 to its maximum width.

Figure 3F:
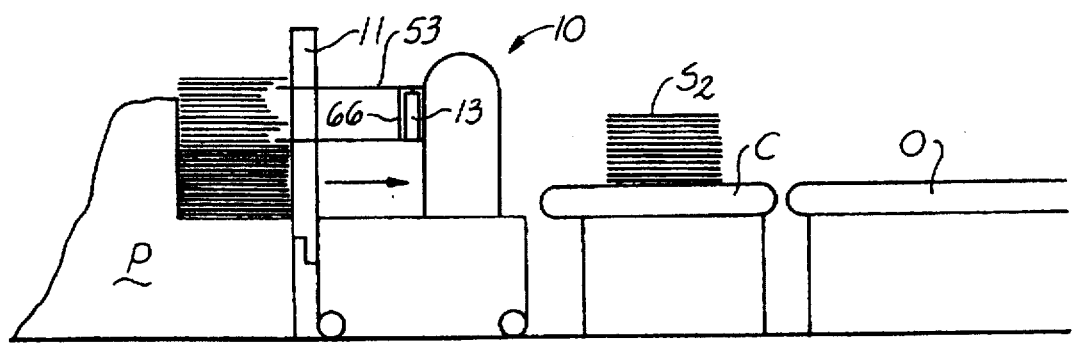

In FIG. 3F, motor 19 is reversed once again. Due to extractor plates 11 and the fact that stack $S_1$ is wider than the distance between the extractor plates 11, stack $S_1$ remains in prefeeder P while clamp 53 is removed. At this point, the prefeeder hopper is replenished.

Figure 3G:
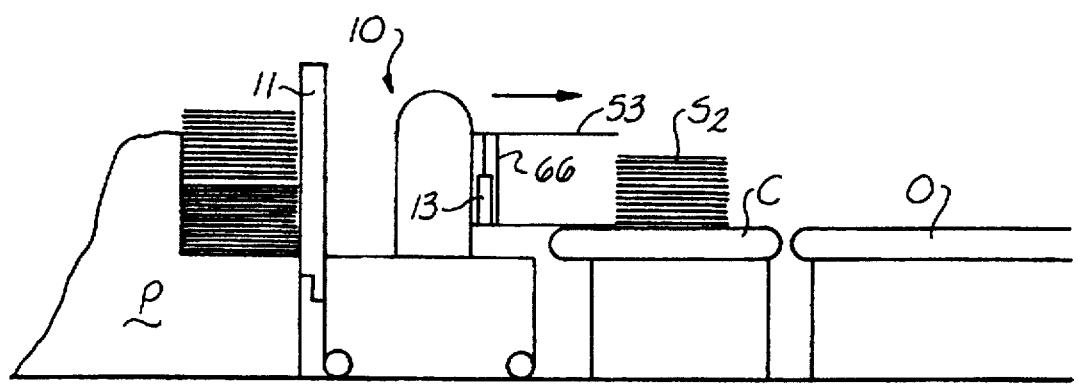
Figure 3H:
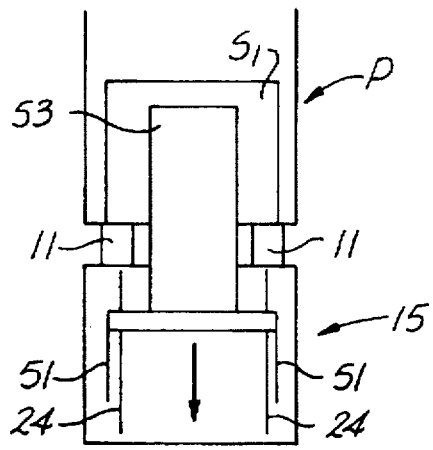
FIG. 3H is a simplified plan view showing the stack turner and replenisher according to the invention in the configuration of FIG. 3F.

Finally, in FIG. 3G, motor 19 continues running in the same manner and motor 64 is reversed. Therefore, clamp 53 is reverted back to its original position ready to pick up the next stack of articles $S_2$ upon receipt of the signal. Stack $S_2$ was brought intoposition during the turning and replenishing of stack $S_1$ (FIGS. 3D–3F) by an output conveyor O.

The above description is given in reference to a stack turner and replenisher. However, it is understood that many variations are apparent to one of ordinary skill in the art from a reading of the above specification and such variations are within the spirit and scope of the instant invention as defined by the following appended claims.

That which is claimed:

1. A stack turner and replenisher comprising:

a clamp for receiving a stack of articles;

a first power source associated with said clamp for moving said clamp in a lateral direction;

a second power source associated with said clamp for moving said clamp along an entire length of an inverted U-shaped path, said first and second power sources operating independent of one another;

whereby operating said first and second power sources inverts and moves said stack of articles received in said clamp from a first lateral position to a second lateral position.

2. The stack turner and replenisher according to claim 1 further comprising:

a lower portion, said lower portion supporting said first and second power sources;

an upwardly extending upper portion laterally movable with respect to said lower portion and movably supporting said clamp, said upper portion associated with said first source of power;

whereby by said first power source moving said upper portion in said lateral direction, said clamp is also moved in said lateral direction.

3. The stack turner according to claim 2, wherein:

said first power source is a first motor mounted on one side of said lower portion, and said upper portion is associated with said first motor by use of:

at least one rod extending the length of said lower portion and from said first lateral position to said second lateral position;

at least one bearing attached to a bottom of said upper portion and receiving said at least one rod therethrough;

a first sprocket mounted on a drive shaft of said first motor;

a second sprocket mounted on an opposite side of said upper portion from said first motor; and a chain spanning said first and second sprockets and attached to said bearing;

whereby operating said first motor causes said bearing and said upper portion to move in said lateral direction.

4. The stack turner and replenisher according to claim 3, wherein:

said second power source is a second motor mounted inside said lower portion, and said clamp is associated with said second motor by use of:

a drive sprocket mounted to an output shaft of said second motor;

a chain guide mounted to the top of said upper portion; and a chain spanning said drive sprocket and said chain guide and attached to said clamp.

5. The stack turner and replenisher according to claim 4, wherein said chain guide is stationary and has a parabolic shape.

6. The stack turner and replenisher according to claim 1, further comprising a carriage supporting said clamp, said carriage associated with said second source of power for moving said clamp to invert said stack of articles.

7. The stack turner and replenisher according to claim 6, wherein said carriage further comprises rollers on ends thereof, said rollers rolling within an inverted u-shaped groove in an upper portion of said stack turner and replenisher.

8. The stack turner and replenisher according to claim 1 wherein said clamp further comprises:

an upper plate;

a lower plate;

a mechanism for allowing the distance between said upper and lower plates to be varied; and a rear registration wall.

9. The stack turner according to claim 8, wherein said mechanism for allowing the distance between said upper and lower plates to be varied comprises a fluidic cylinder attached to said upper and lower plates.

10. The stack turner and replenisher according to claim 1, further comprising casters on a lower portion providing the capability of moving said stack turner and replenisher adjacent a hopper of a prefeeding device and a source of stacks of articles to be placed in said hopper of said prefeeding device.

11. The stack turner and replenisher according to claim 1, wherein said first lateral position is adjacent a conveyor and said second lateral position is adjacent a hopper of a prefeeding device.

12. The stack turner and replenisher according to claim 11, further comprising a pair of spaced apart extractor plates adjacent said lateral position adjacent said hopper of said prefeeding device.

13. A method of automatically filling a hopper of an article prefeeder, comprising the steps of:

providing a stack of articles;

picking up said stack of articles using a clamp;

simultaneously inverting said stack embraced by the clamp and moving said stack embraced by the clamp in a lateral direction including an inverted U-shaped path;

depositing said stack in said hopper of said article prefeeder removing said articles from said clamp by releasing the clamp and using extractor plates; and inverting and moving said clamp in directions opposite to said first inverting and moving directions so as to place said clamp in a position where it may receive another stack of articles.

14. The method according to claim 13, wherein said step of inverting and moving further includes the step of vertically squaring said stack of articles by use of gravity and a rear wall of said clamp.

15. The method according to claim 14 wherein said step of squaring occurs at the uppermost point along said inverted u-shaped path.

16. The method according to claim 15, further including the step of laterally squaring said stack of articles at said uppermost point.

17. A stack turner and replenisher comprising:

a clamp for receiving a stack of articles;

at least one power source moving said clamp along a guide defining an inverted u-shaped path and moving said guide along a lateral directio with said U-shaped path, whereby operating said at least one power source inverts and moves said stack of articles received in said clamp from a first lateral position adjacent a conveyor to a second lateral position adjacent a hopper of a prefeeding device; and a pair of spaced apart extractor plates adjacent said second lateral position.

18. The stack turner and replenisher according to claim 17 wherein said clamp further comprises:

an upper plate;

a lower plate;

a mechanism for allowing the distance between said upper and lower plates to be varied; and a rear registration wall.

19. The stack turner according to claim 18, wherein said mechanism for allowing the distance between said upper and lower plates to be varied comprises a fluidic cylinder attached to said upper and lower plates.

20. The stack turner and replenisher according to claim 17, further comprising casters on said lower portion providing the capability of moving said stack turner and replenisher adjacent a hopper of a prefeeding device and a source of stacks of articles to be placed in said hopper of said prefeeding device.

* * * * *